INVENTORS
BELA BARENYI
HEINRICH HASELMANN
BY
Dicke + Craig
ATTORNEYS

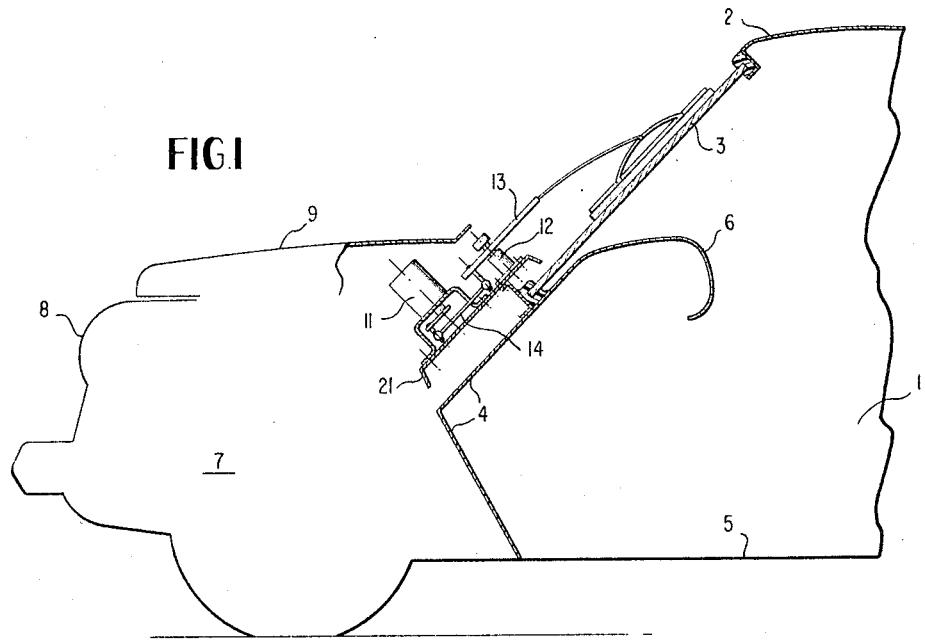
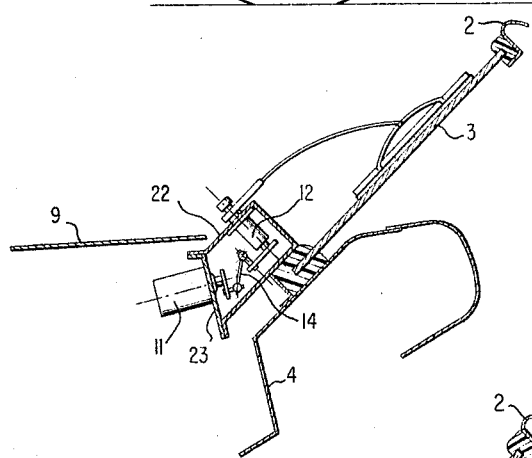
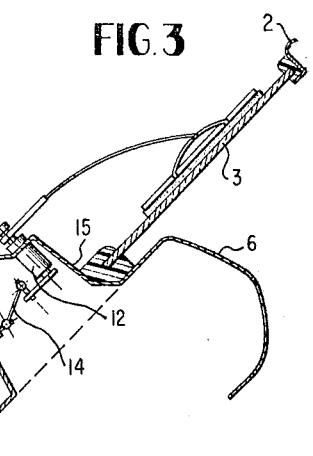
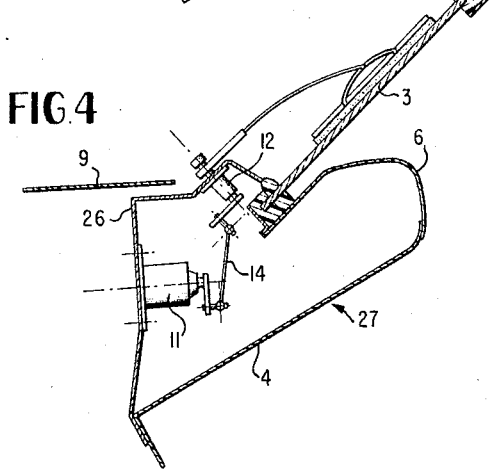

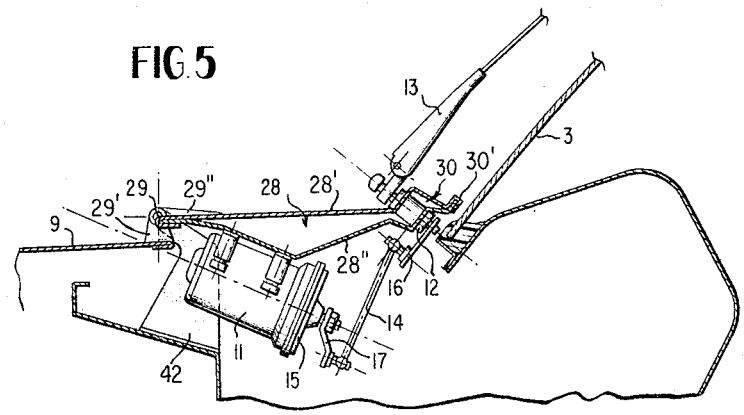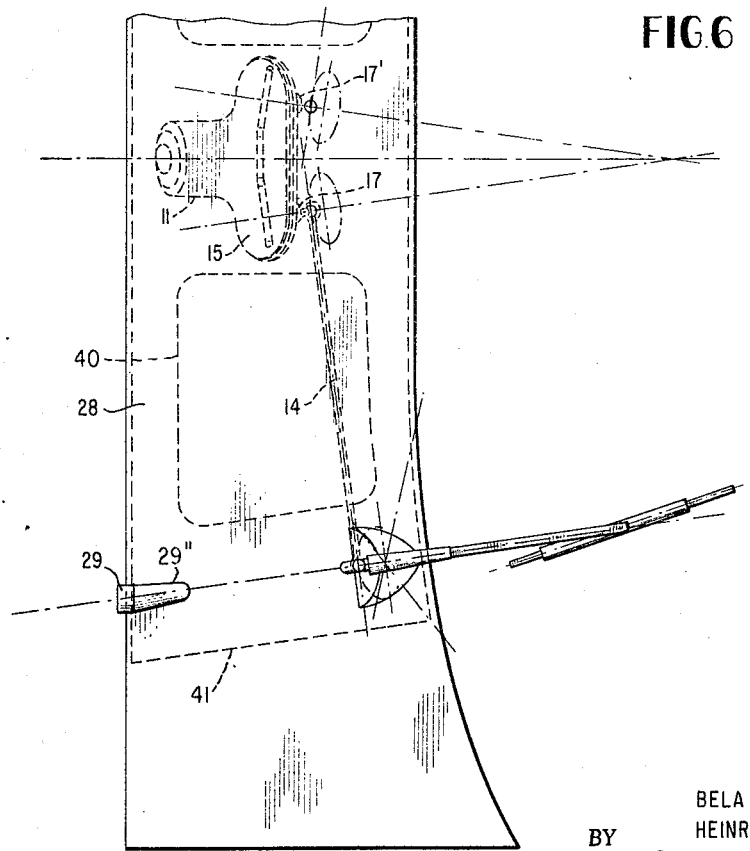

United States Patent Office 3,264,670
Patented August 9, 1966

3,264,670
WINDSHIELD WIPER ARRANGEMENT
Béla Barényi, Stuttgart-Vaihingen, and Heinrich Haselmann, Sindelfingen, Germany, assignors to Daimler-Benz Aktiengesellschaft, Stuttgart-Unterturkheim, Germany
Filed Nov. 27, 1963, Ser. No. 326,474
Claims priority, application Germany, Dec. 1, 1962, D 40,419
7 Claims. (Cl. 15—250.27)

The present invention relates to a windshield wiper arrangement in vehicles, especially passenger motor vehicles, and serves as solution for the problem to so install and accommodate the drive and bearing elements of the windshield wiper installation that they are easy to assemble and install as well as readily accessible for service and repair and additionally that apertures in wall parts or panels of the vehicle which would otherwise have to be sealed are avoided.

The present invention essentially consists in that the drive, support and bearing elements of the windshield wiper installation are secured completely outside the fire wall of the vehicle at a bearer element arranged within the area of the lower edge of the windshield and extending transversely to the vehicle. For purposes of such bearer element may be used, for example, a cross girder or brace arranged essentially parallel to the windshield, a bow-shaped cross member of U-shaped cross section, preferably open in the downward direction or also the walls of a transversely disposed hollow bearer. With the use of a bow-shaped member or hollow bearer as bearer element, either some or all of the drive, support, and bearing elements of the windshield wiper installation may be arranged appropriately inside of the bow-shaped cross member or of the hollow bearer element.

The arrangement of the windshield wiper installation at such a bearer element offers the additional advantage that the bearer element together with the elements of the windshield wiper installation may form a preassembled sub-assembly to be secured at the vehicle in a readily detachable manner which is additionally easily accessible for service and repairs after lifting up a hood and/or after removal of a cover or lid.

A particularly advantageous construction of the present invention essentially consists in utilizing as bearer element an intermediate piece arranged between the hood for the engine or luggage space and windshield which intermediate piece is preferably constructed as detachable cover or removable lid or as a pivotable or tiltable hood. The windshield wiper motor may appropriately be secured at the bottom of the cover or hood and the windshield wiper bearing supports may extend through a rim portion of the cover or hood which is bent up approximately parallel to the windshield. Such a sub-assembly is particularly easy to install and to service.

With a windshiled wiper arrangement according to the present invention, the windshield wiper motor is appropriately accommodated between the bearing places for two windshield wipers whereby a transmission gear unit may be connected or combined advantageously with the windshield wiper motor which is provided on both sides of the center thereof with one drive shaft each for each of the windshield wipers. Care may be taken by the interposition of bevel gears or the like to permit the output or drive shafts of the transmission unit to extend parallel to the coordinated or associated shafts of the windshield wiper installation. Such an arrangement becomes particularly simple if the motor-transmission unit is arranged exactly centrally with respect to the windshield wipers and the coupling rods or links leading to the windshield wipers are interchangeably identical.

Accordingly, it is an object of the present invention to provide a windshield wiper arrangement of the type described hereinabove which is simple in construction as well as easy to assemble and install yet avoids the shortcomings and drawbacks normally encountered with the prior art constructions.

Another object of the present invention resides in the provision of a windshield wiper installation, especially for passenger motor vehicles, which may be readily installed and disassembled, yet is also easily accessible for service and repairs in the installed condition.

A further object of the present invention resides in the provision of a windshield wiper installation which obviates the need for apertures in wall parts of the vehicle, particularly those body parts or wall panel parts which normally protect the passenger compartment, and therewith dispenses with the need of expensive, costly, and never completely reliable seals for such apertures.

Still another object of the present invention resides in the provision of a windshield wiper arrangement that lends itself to sub-assembly design and installation as a complete sub-assembly within the vehicle in a readily detachable manner.

Still another object of the present invention resides in the provision of a windshield wiper arrangement for motor vehicles which may be rendered readily accessible by simply lifting or removing a hood or cover, respectively.

Still a further object of the present invention resides in the provision of a windshiled wiper installation for vehicles, especially passenger motor vehicles, which minimizes the danger of penetration into the passenger compartment of rain water or the like through apertures required for the bearing supports and/or connections of the windshield wiper mechanism.

Another object of the present invention resides in the provision of a windshield wiper installation for motor vehicles which facilitates a symmetrical construction of a multi-wiper installation and which is so constructed and arranged as to permit far-reaching standardization by the use of identical parts for the symmetrically constructed actuation of two windshield wipers.

These and other objects, features, and advantages of the present invention will become more obvious from the following description when taken in connection with the accompanying drawing which shows, for purposes of illustration only, several embodiments in accordance with the present invention, and wherein:

FIGURE 1 is a partial schematic longitudinal cross-sectional view through a passenger motor vehicle with a windshield wiper arrangement in accordance with the present invention mounted on a cross girder;

FIGURE 2 is a partial schematic longitudinal cross-sectional view, similar to FIGURE 1, of a modified embodiment of a windshield wiper installation in accordance with the present invention mounted on a bow-shaped cross member;

FIGURE 3 is a partial schematic longitudinal cross-sectional view, similar to FIGURE 2, of a still further modified embodiment of a windshield wiper installation in accordance with the present invention mounted on an intermediate piece disposed between the engine hood and the windshield;

FIGURE 4 is a partial schematic longitudinal cross-sectional view, similar to FIGURE 2, of another modified embodiment of a windshield wiper installation in accordance with the present invention mounted on the walls of a hollow bearer;

FIGURE 5 is a partial schematic longitudinal cross-sectional view, similar to FIGURE 2 and on an enlarged scale, of a still further modified embodiment of a windshield wiper installation in accordance with the present invention mounted on an intermediate piece constructed as cover or lid;

FIGURE 6 is a plan view on one-half of the lid for the windshield wiper installation according to FIGURE 5;

Figure 7:
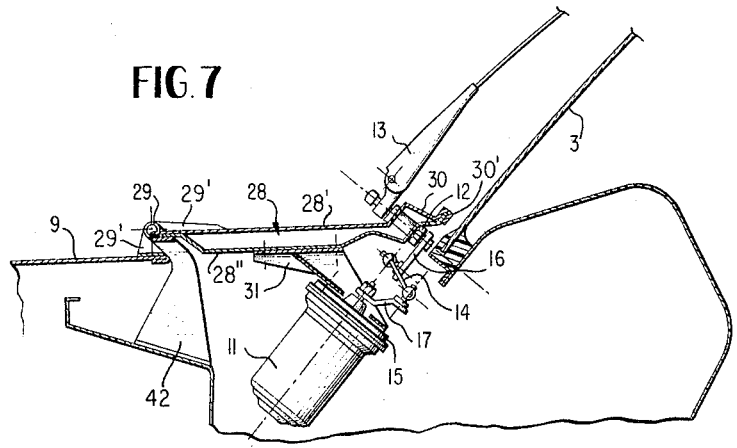
FIGURE 7 is a partial schematic longitudinal cross-sectional view of a modified embodiment, similar to FIGURE 5, of a windshield wiper installation in accordance with the present invention.

Referring now to the drawing wherein like reference numerals are used throughout the various views to designate like parts, and more particularly to FIGURE 1, the passenger motor vehicle schematically illustrated in longitudinal cross section in this figure includes a passenger space 1 that is delimited by the roof 2, the windshield 3, and the forward dashboard or fire wall 4. The dashboard or fire wall 4 extends at first approximately parallel to the windshield 3 and then at an angle toward the floor surface 5 of the vehicle. The upper section of the fire wall 4 passes over into the instrument panel 6. The luggage or engine space may be disposed within the section 7 of the vehicle adjoining the dashboard or fire wall 4 in the forward direction. This section 7 is closed off in front by the vehicle outer body panels 8 and on top by a liftable or pivotal hood 9 of conventional construction.

For purposes of cleaning the windshield 3, a windshield wiper installation is provided in the vehicle of FIGURE 1 which consists of the windshield wiper motor 11 and of the windshield wipers 13 supported in a conventional manner at 12. The motor 11 and the windshield wipers 13 which may be of any conventional construction are connected with one another by coupling rods or links 14. All of the parts of this windshield wiper installation are suitably secured on a bearer element 21 in the form of a transverse girder which is arranged completely outside the dashboard or fire wall 4 of the vehicle within the area of the lower edge of the windshield 3 and extends essentially parallel to the windshield 3.

Such a cross girder 21 may be secured in a readily detachable manner at conventional lateral bearer parts (not shown) of the vehicle formed, for example, by frame or body parts of a self-supporting type body construction, so that the elements of the windshield wiper installation may be pre-assembled on the cross girder 21 and the thus-produced sub-assembly is then installed as a unit into the vehicle without any difficulties. Additionally, the windshield wiper installation is readily accessible after opening of the hood 9 for purposes of servicing. Furthermore, apertures in the fire wall 4 are avoided by the arrangement according to the present invention of the drive and bearing elements of the windshield wiper installation on such a cross girder 21 which apertures would otherwise require a careful and costly sealing. Moreover, even with most careful sealing, there always exists still the danger at such apertures that in due course rain water may enter into the vehicle interior space through these apertures.

In the embodiment according to FIGURE 2, the windshield wiper motor 11, the windshield wiper bearings 12, and the coupling rods 14 are arranged inside of a bow-shaped cross member 22 of substantially U-shaped cross section and open in the downward direction. This bow-shaped member 22 is also located again outside the fire wall 4 of the vehicle within the area of the lower edge of the windshield 3 and like the cross girder described above may be constructed as structural unit or assembly which is secured at corresponding support parts of the vehicle in a readily detachable manner. Also in this embodiment, the individual elements of the windshield wiper installation are again easily accessible for service after opening of the hood 9. The cover 23 closing the bow-shaped member 22 and carrying the motor 11 may be provided with flaps or apertures which assure a good accessibility of the bearings 12 and of the coupling rods 14.

Similar as with the embodiment according to FIGURE 2, the windshield wiper installation according to FIGURE 3 is secured at a bearer element 15 which bridges the gap between the hood 9 and the lower edge of the windshield 3. The bearer element 15, however, is a saddle or bridging piece that adjoins directly the instrument panel 6. Again, the elements 11, 12 and 14 of the windshield wiper installation are well protected also in this case but are arranged so as to be easily accessible after opening of the hood 9.

With the embodiment according to FIGURE 4, the elements 11 and 12 of the windshield wiper installation are secured at a sheet-metal part 26 which is completed into a transversely disposed hollow bearer 27 by the upper part of the dashboard or fire wall 4 and the instrument panel 6. The elements 11, 12 and 14 are thereby disposed within this hollow bearer 27, however, are again located outside the dashboard or fire wall 4 and within the area of the lower edge of the windshield 3. Also in this case the accessibility to the elements of the windshield wiper installation is assured by apertures (not shown) which are provided within the sheet-metal bearer part 26 which apertures can be easily reached after opening of the hood 9.

Particularly advantageous embodiments of construction of the present invention are illustrated in the embodiments of FIGURES 5 to 8. In these embodiments, the windshield wiper motor 11 which forms a structural unit with the transmission 15, is secured at the bottom side of an intermediate piece or structural part generally designated by reference numeral 28 and arranged between the engine or luggage space hood 9 and the windshield 3. This intermediate piece or structural part 28 is constituted by an upper sheet metal element 28' and a lower sheet metal element 28". These two sheet metal elements 28' and 28" are rigidly connected with each other, for example, by flanging along the edges thereof disposed transversely to the vehicle axis and form a hollow rigid box-shaped part that is adapted to be tilted about the axis 29.

For that purpose, the intermediate structural part 28 is supported on the shaft or axis 29 by means of the hinge parts 29". The shaft 29 in turn is supported by bearing lugs or brackets 42 secured at the bearing parts of the vehicle, such as the frame or body of a self-supporting type structure. The hood 9 is also pivotally connected at this shaft 29 by means of the hinge parts 29' so that one single bearing and pivot point results therefrom for the pivotal hood 9 and the pivotal intermediate piece 28 which is advantageous from a manufacturing and assembly point of view.

The rim 30 of this box-like windshield intermediate part 28 disposed within the area of the windshield 3 is bent in the upward direction parallel to the windshield at 30' at the flanged-over end thereof facing the windshield so that a gap is formed between the bent-up part 30' and the windshield 3. The windshield wiper bearings 12 extend through both sheet metal elements 28' and 28" of the hollow box-like intermediate piece 28 within the area of the rim at places characterized locally by portions extending parallel to the windshield 3 so that the windshield wipers 13 are disposed above and the crank arms 16 below the hollow box-like intermediate piece 28. The crank arms 16 are connected with the cranks 17 at the transmission 15 of the windshield wiper motor 11 by way of coupling rods or links 14 and 14'. The motor 12 is secured either directly or by means of an angle iron 31 constructed as bracket at the lower sheet metal element 28" in any suitable manner. The lower sheet metal element 28" extends up to the line 41 indicated in FIGURES 6 and 8. It also is provided with apertures, the contours of which are designated by reference numeral 40. These apertures 40 serve the purposes of saving weight and possibly improving the accessibility in connection with the mounting of the motor at the lower sheet metal element 28".

The arrangements according to FIGURES 5 to 8 assure a particularly simple assembly and mounting as well as good accessibility and simple servicing of the windshield wiper installation. The gap formed between the intermediate piece 28 and the windshield 3 permits that the water wiped off from the windshield and the dust or the like removed therefrom can leave through the gap and can thereby be removed effectively from the windshield 3. Since the intermediate piece 28 does not abut at the windshield 3, it need not be accurately fitted; for small manufacturing inaccuracies are not visible by reason of the gap.

Figure 8:
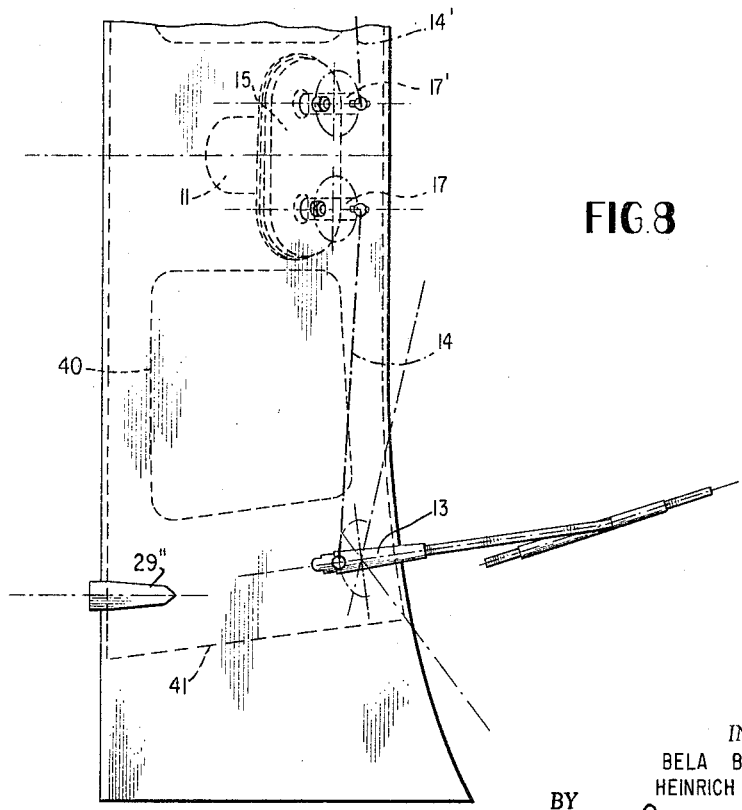
FIGURE 8 is a plan view of one-half of the windshield wiper installation according to FIGURE 7.

As illustrated more clearly in FIGURES 6 and 8, the windshield wiper motors are arranged in the embodiments of FIGURES 5 to 8 centrally with respect to the two windshield wipers of the vehicle and are provided with a transmission 15 which is provided on both sides of the center thereof with two output or drive shafts having cranks 17 and 17'. A completely symmetrical construction of the installation and especially also the use of identical coupling rods or links 14 and 14' may be achieved thereby. Whereas in the embodiment according to FIGURES 5 and 6, the windshield wiper motor 11 is so secured at the cover 28 that the axes of rotation of the output shafts of the transmission 15 and the axes of the windshield wiper bearings 12 only have a slight inclination with respect to one another, they are disposed approximately perpendicularly to one another with the motor of FIGURE 7 which is secured by means of an angle iron 31.

While we have shown and described several embodiments in accordance with the present invention, it is understood that the same is not limited thereto but is susceptible of numerous changes and modifications as known to a person skilled in the art. For example, a symmetrical construction of the windshield wiper installation may be achieved advantageously by the teachings of the present invention with any known windshield wiper construction.

Thus, it is obvious that the present invention may be modified in numerous ways without departing from the spirit and scope thereof, and we, therefore, do not wish to to be limited to the details shown and described herein but intend to cover all such changes and modifications as are encompassed by the scope of the appended claims.

The term "transverse wall" is used in the following claims to designate the wall part 4 that may be constituted by the dashboard, fire wall or any similar wall structure normally used with vehicles. Similarly, the body parts merely generally described and shown schematically herein may be of any conventional construction and form no part of the present invention. The hood 9 may be pivoted either at its front or rear end by any appropriate hinge means while the individual parts forming body panels may be stamped sheet-metal parts or steel plates shaped in any suitable manner. The various parts may be secured to one another also in any conventional manner, for example, by bolts and nuts or welding where permanent connections are desired. The individual parts of the wiper installations such as the motor, the coupling rods, the windshield wiper arms and blades may be of any conventional known construction.

We claim:

1. A windshield wiper arrangement for vehicles, especially passenger motor vehicles having a transverse boundary wall for the passenger space and a windshield, comprising:
    a stationary bearer member,
    drive and bearing means for the windshield wiper arrangement,
    all of said drive and bearing means being secured to said bearer member,
    and said bearer member extending substantially transversely to the vehicle and being disposed in the installed condition within the area of the lower edge of the windshield with said drive and bearing means being located completely outside the transverse wall, said bearer member being assembled together with the elements of the windshield wiper arrangement into a preassembled unit that is rigidly secured at the vehicle in a readily detachable manner.

2. A windshield wiper arrangement for vehicles, especially passenger motor vehicles having a transverse boundary wall for the passenger space and a windshield, comprising:
    a stationary bearer member,
    drive and bearing means for the windshield wiper arrangement,
    all of said drive and bearing means being secured to said bearer member,
    and said bearer member extending substantially transversely to the vehicle and being disposed in the installed condition within the area of the lower edge of the windshield with said drive and bearing means being located completely outside the transverse wall,
    said bearer member being assembled together with the elements of the windshield wiper arrangement into a preassembled unit that is rigidly secured at the vehicle in a readily detachable manner,
    said bearer element being constituted by a cross girder arranged essentially parallel to the windshield and spaced from said transverse wall.

3. A windshield wiper arrangement for vehicles, especially passenger motor vehicles having a transverse boundary wall for the passenger space and a windshield, comprising:
    a stationary bearer member,
    drive and bearing means for the windshield wiper arrangement,
    all of said drive and bearing means being secured at said bearer member,
    and said bearer member extending substantially transversely to the vehicle and being disposed in the installed condition within the area of the lower edge of the windshield with said drive and bearing means being located completely outside the transverse wall,
    said bearer member being constituted by a bow-shaped member of essentially U-shaped cross section and open toward the bottom, a gap being provided between said bearer member and said windshield and said bearer member and said vehicle body construction in front of said windshield,
    at least some of the drive and bearing means of the windshield wiper installation being arranged within said bow-shaped member.

4. A windshield wiper arrangement for vehicles, especially passenger motor vehicles having a transverse boundary wall for the passenger space and a windshield, comprising:
    a stationary bearer member,
    drive and bearing means for the windshield wiper arrangement,
    all of said drive and bearing means being secured to said bearer member,
    and said bearer member extending substantially transversely to the vehicle and being disposed in the installed condition within the area of the lower edge of the windshield with said drive and bearing means being located completely outside the transverse wall,
    said bearer member being constituted by the wall of a transversely disposed hollow bearer and merging into a dashboard for said vehicle,
    at least some of the drive and bearing means of the windshield wiper installation being arranged within said hollow bearer member,
    said bearer member being assembled together with the elements of the windshield wiper arrangement into a preassembled unit that is rigidly secured at the vehicle in a readily detachable manner.

5. A windshield wiper arrangement for vehicles, especially passenger motor vehicles having a transverse wall defining the passenger space and a windshield, comprising:
- a transversely extending stationary bearer member,
- drive and bearing means for the windshield wiper arrangement,
- all of said drive and bearing means being secured to said bearer member,
- and said bearer member being disposed in the installed condition within the area of the lower edge of said windshield with said drive and bearing means being located outside the transverse wall,
- said bearer element including an intermediate piece and being arranged between the windshield and the adjoining vehicle body construction forming the vehicle forward end, said intermediate piece being constituted by a bow shaped member of essentially U-shaped cross section and open toward the bottom, a gap being provided between said intermediate piece and the windshield and between said intermediate piece and the body construction forming the vehicle forward end in front of said windshield.

6. A windshield wiper arrangement for vehicles, especially passenger motor vehicles having a transverse wall defining the passenger space, a vehicle hood and a windshield, comprising:
- a transversely extending bearer element,
- drive and bearing means for the windshield wiper arrangement,
- all of said drive and bearing means being secured to said bearer member,
- and said bearer member being disposed in the installed condition within the area of the lower edge of said windshield with said drive and bearing means being located outside the transverse wall,
- said bearer element being constituted by an intermediate piece arranged between the windshield and the adjoining vehicle body construction including the vehicle hood forming the vehicle forward end,
- said intermediate piece being disposed generally horizontally and constructed as liftable structure movable to a position wherein said drive and bearing means are disposed above the vehicle body construction including the vehicle hood forming the vehicle forward end in front of said windshield.

7. The combination according to claim 6, wherein the liftable structure constituting the intermediate piece is a pivotal member.

References Cited by the Examiner

UNITED STATES PATENTS

| | | | |
|---|---|---|---|
| 2,270,589 | 1/1942 | Hansen | 15—250.27 |
| 2,600,622 | 6/1952 | Dahlgren | 15—250.16 X |
| 2,760,221 | 8/1956 | Hitzelberger | 15—250.27 X |
| 2,895,157 | 7/1959 | Kocourek | 15—250.19 |
| 2,936,477 | 5/1960 | Feller | 15—250.19 |
| 2,947,020 | 8/1960 | Wilfert et al. | 15—250.16 |
| 3,016,558 | 1/1962 | Deibel | 15—250.19 |
| 3,078,494 | 2/1963 | Price | 15—250.17 |
| 3,120,673 | 2/1964 | Buchwald | 15—250.19 X |

CHARLES A. WILLMUTH, *Primary Examiner.*